US010789570B1

(12) United States Patent
Marlow et al.

(10) Patent No.: US 10,789,570 B1
(45) Date of Patent: Sep. 29, 2020

(54) PARTS INVENTORY MANAGEMENT

(71) Applicant: Allstate Insurance Company, Northbrook, IL (US)

(72) Inventors: Clint J. Marlow, Barrington, IL (US); Robert L. Trinco, Schaumburg, IL (US); John A. Riggio, Mundelein, IL (US)

(73) Assignee: Allstate Insurance Company, Northbrook, IL (US)

( * ) Notice: Subject to any disclaimer, the term of this patent is extended or adjusted under 35 U.S.C. 154(b) by 110 days.

(21) Appl. No.: 15/941,090

(22) Filed: Mar. 30, 2018

Related U.S. Application Data

(63) Continuation of application No. 15/401,670, filed on Jan. 9, 2017, now Pat. No. 9,965,742, which is a continuation of application No. 13/798,605, filed on Mar. 13, 2013, now Pat. No. 9,595,019.

(51) Int. Cl.
*G06Q 40/00* (2012.01)
*G06Q 10/08* (2012.01)
*G06F 16/9535* (2019.01)

(52) U.S. Cl.
CPC ....... *G06Q 10/087* (2013.01); *G06F 16/9535* (2019.01)

(58) Field of Classification Search
CPC .......................... G06Q 10/087; G06F 16/9535
USPC ...................................................... 705/16, 28
See application file for complete search history.

(56) References Cited

U.S. PATENT DOCUMENTS

| 4,905,363 | A | 3/1990 | Boyenval |
| 5,504,674 | A | 4/1996 | Chen et al. |
| 5,950,169 | A * | 9/1999 | Borghesi ............ G06Q 30/0283 705/4 |
| 6,732,417 | B2 * | 5/2004 | Kaburagi ............... G06Q 10/06 29/407.01 |
| 6,823,258 | B2 | 11/2004 | Ukai et al. |
| 7,680,706 | B2 | 3/2010 | Bowser et al. |
| 8,229,767 | B2 | 7/2012 | Birchall |
| 2002/0035488 | A1 * | 3/2002 | Aquila ................... G06Q 50/24 705/4 |
| 2002/0055861 | A1 | 5/2002 | King et al. |

(Continued)

FOREIGN PATENT DOCUMENTS

WO  2001002983 A2  1/2001

OTHER PUBLICATIONS

"How to Determine the Value of a Salvaged Car", wikiHow to do anything, downloaded from <http://www.wikihow.com/Determine-the-Value-of-a-Salvaged-Car> on Jun. 2, 2013.

(Continued)

*Primary Examiner* — Rokib Masud
(74) *Attorney, Agent, or Firm* — Banner & Witcoff, Ltd.

(57) ABSTRACT

Systems, methods, apparatuses and computer-readable media for analyzing vehicle claim information from a vehicle that is deemed a total loss to determine one or more parts that may be removed from the total loss vehicle for reuse is presented. In some arrangements, the parts identified for reuse may be identified prior to removal from the total loss vehicle and may be identified as available inventory and may include a future availability date. One or more repair shops may then request the parts available for reuse and the part may be reserved for that shop until it becomes available.

20 Claims, 5 Drawing Sheets

(56) References Cited

U.S. PATENT DOCUMENTS

| | | | |
|---|---|---|---|
| 2003/0036964 A1 | 2/2003 | Boyden et al. | |
| 2003/0050843 A1 | 3/2003 | Onoue | |
| 2005/0035488 A1 | 2/2005 | Caivano | |
| 2005/0055861 A1* | 3/2005 | McAnulty | G09F 7/18 40/654.01 |
| 2005/0125261 A1* | 6/2005 | Adegan | G06Q 10/06 705/4 |
| 2006/0155587 A1 | 7/2006 | Sparrow | |
| 2006/0195384 A1 | 8/2006 | Bauer et al. | |
| 2007/0124906 A1 | 6/2007 | Jin | |
| 2007/0179868 A1 | 8/2007 | Bozym | |
| 2008/0255887 A1 | 10/2008 | Gruter | |
| 2009/0048944 A1 | 2/2009 | Eagle | |
| 2010/0293181 A1 | 11/2010 | Muller et al. | |
| 2010/0299161 A1 | 11/2010 | Burdick et al. | |
| 2011/0153372 A1 | 6/2011 | Weinstock et al. | |
| 2011/0313936 A1 | 12/2011 | Sieger | |
| 2012/0030046 A1 | 2/2012 | Fullerton | |
| 2012/0076437 A1 | 3/2012 | King | |

OTHER PUBLICATIONS

"How to Profit From Car Crashes", InvestorPlace, downloaded from <http://investorplace.com/2012/06/how-to-profit-from-car-crashes/> on Jun. 2, 2013.
"Auto Salvage Marketplace", streetdirectory.com, downloaded from <http://www.streetdirectory.com/travel_guide/49049/cars/augo_salvage . . . > on Jun. 2, 2013.
"Total Loss", downloaded from <http://www.progressive.com/claims/total-loss.aspx> on Jun. 2, 2013.
"Crash Repair in the UK: Reusing Salvaged Parts in Car Repair Centres", downloaded from <http://epubs.surrey.ac.uk/110183/17/crash_repair_-_reusing_salvaged_parts_in_crash_repair_centres_-_third_revision_ (file_review).pdf>.
"Post/Sell Your Salvage Vehicle", downloaded from <http://www.automotix.net/autosalvage/post_your_salvage.html> on Nov. 12, 2013.
Notice of Allowance in related U.S. Appl. No. 13/798,975 dated Apr. 2, 2014.
Krishna S. Vatsa, "Risk, Vulnerability, and Asset-based Approach to Disaster Risk Management", The International Journal of Sociology and Social Policy; 2004; 24, 10/11; ProQuest Central p. 1.
Oct. 13, 2016—U.S. Notice of Allowance—U.S. Appl. No. 13/798,605.
Aug. 12, 2014—U.S. Non-Final Office Action—U.S. Appl. No. 13/798,605.
May 7, 2015—U.S. Final Office Action—U.S. Appl. No. 13/798,605.
Jan. 21, 2016—U.S. Non-Final Office Action—U.S. Appl. No. 13/798,605.
Jun. 15, 2016—U.S. Final Office Action—U.S. Appl. No. 13/798,605.
Aug. 28, 2017—U.S. Non-Final Office Action—U.S. Appl. No. 15/401,670.
Jan. 2, 2018—U.S. Notice of Allowance—U.S. Appl. No. 15/401,670.

* cited by examiner

PARTS INVENTORY MANAGEMENT

CROSS REFERENCE TO RELATED APPLICATIONS

This application is a continuation of and claims priority to co-pending U.S. application Ser. No. 15/401,670, filed Jan. 9, 2017, and entitled "Parts Inventory Management," which is a continuation of and claims priority to U.S. application Ser. No. 13/798,605 (now U.S. Pat. No. 9,595,019), filed Mar. 13, 2013, and entitled "Parts Inventory Management," which are incorporated herein by reference in their entirety.

TECHNICAL FIELD

Aspects of the disclosure generally relate to the analysis of accident claim information and part availability. In particular, various aspects described herein relate to managing parts inventory based on identified availability of parts.

BACKGROUND

Repair of damaged vehicles is a necessary aspect of any insurance company's business. However, conventional systems are not necessarily efficient, nor do they capitalize on resources available to the insurance company. For instance, if a vehicle is considered a total loss, the car is often sold to a salvage yard who then may sell various parts of the vehicle. In this arrangement, the insurance company may not realize the entire value or potential uses of the usable parts on the total loss vehicle.

Further, it is often difficult to anticipate when certain parts will be available for use in various repairs and repair shops must often wait to obtain parts needed for a repair.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to systems, methods, apparatuses and computer-readable media for analyzing vehicle claim information from a vehicle that is damaged (such as a total loss vehicle) to determine one or more parts that may be removed from the vehicle for reuse. In some arrangements, the parts identified for reuse may be identified prior to removal from the vehicle and may be identified as available inventory and may include a future availability date. One or more repair shops may then request the parts available for reuse and the part may be reserved for that shop until it becomes available.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
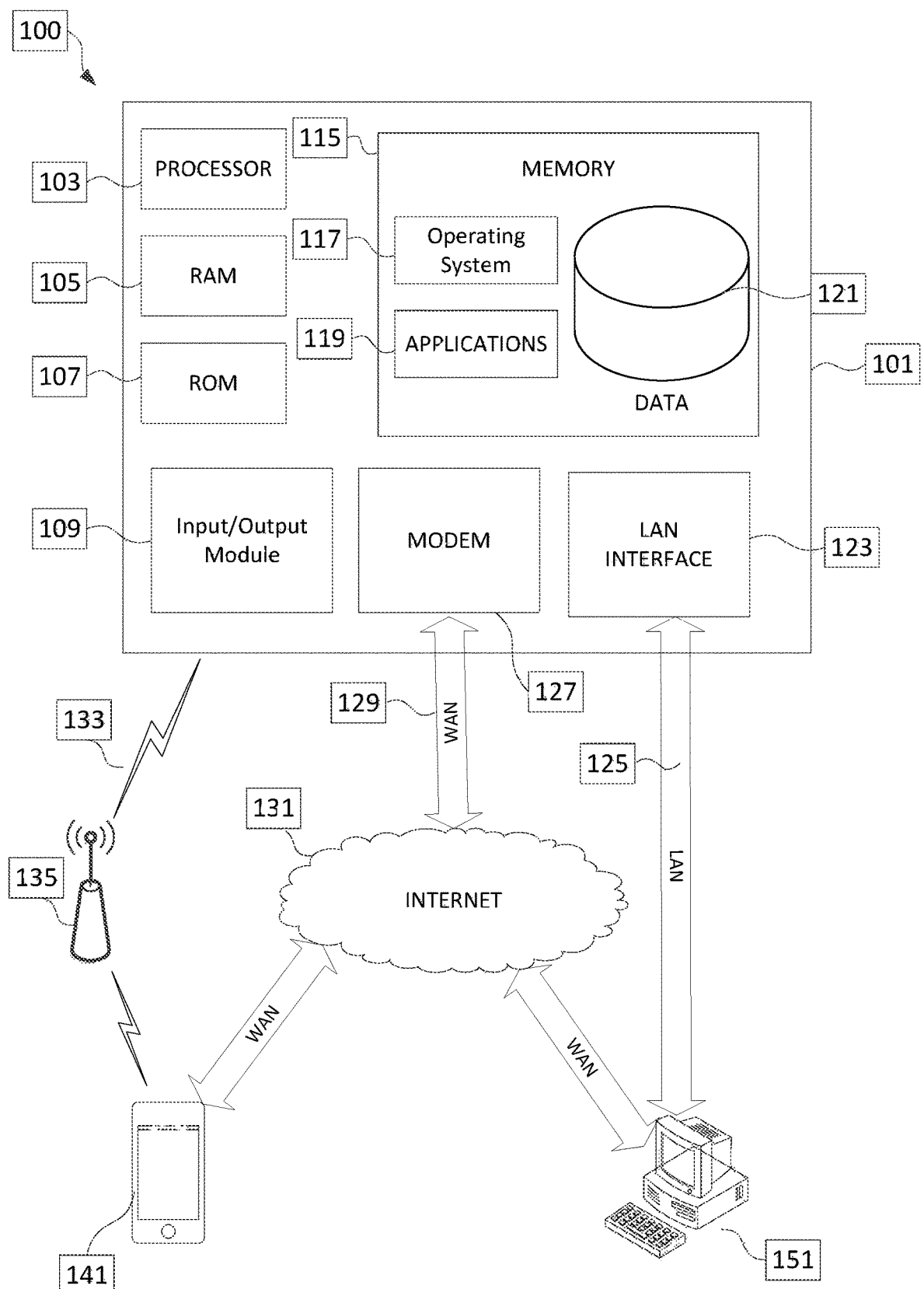
FIG. 1 illustrates a network environment and computing systems that may be used to implement aspects of the disclosure.

FIG. 1 illustrates a block diagram of a computing device (or system) 101 in communication system 100 that may be used according to one or more illustrative arrangements of the disclosure. The device 101 may have a processor 103 for controlling overall operation of the device 101 and its associated components, including RAM 105, ROM 107, input/output module 109, and memory 115. The computing device 101, along with one or more additional devices (e.g., terminals 141, 151) may correspond to any of multiple systems or devices, such as a claim server or system, parts management system, parts management server, parts inventory server, and the like, configured as described herein for receiving and analyzing vehicle accident or claim data and determining whether a portion of the vehicle is salvageable and, if so, whether the part may be useful in repairing another vehicle, as well as managing inventory flow of parts that may be reused.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various functions. For example, memory 115 may store software used by the device 101, such as an operating system 117, application programs 119, and an associated internal database 121. Processor 103 and its associated components may allow the system 101 to execute a series of computer-readable instructions to receive claim data, determine that the vehicle is a total loss, identify, based on the claim information, parts that may be reused, and accessing historical information to determine whether to store the parts for later use or sell the parts. In some examples, additional data (e.g., other than claim data) may be used, in addition to or instead of claim data, to identify parts that may be reused, and access historical information to determine whether to store or sell the parts. Processor 103 and its associated components may also allow the system 101 to control inventory flow of these parts by receiving notification of part availability and transmitting that availability to a repair shop.

The system 101 may operate in a networked environment 100 supporting connections to one or more remote computers, such as terminals 141 and 151. The terminals 141 and 151 may be personal computers, servers (e.g., web servers, database servers), or mobile communication devices (e.g., on-board vehicle computers, mobile phones, portable computing devices, and the like), and may include some or all of the elements described above with respect to the driving analysis system 101. The network connections depicted in FIG. 1 include a local area network (LAN) 125 and a wide area network (WAN) 129, and a wireless telecommunications network 133, but may also include other networks. When used in a LAN networking environment, the system 101 may be connected to the LAN 125 through a network interface or adapter 123. When used in a WAN networking environment, the system 101 may include a modem 127 or other means for establishing communications over the WAN 129, such as network 131 (e.g., the Internet). When used in a wireless telecommunications network 133, the system 101 may include one or more transceivers, digital signal processors, and additional circuitry and software for communicating with wireless computing devices 141 (e.g., mobile phones, portable computing devices, and the like) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices and system components described herein may be configured to communicate using any of these network protocols or technologies.

Additionally, one or more application programs 119 used by the parts management system 101 may include computer executable instructions (e.g., parts management analysis, parts matching algorithms, etc.) for receiving vehicle accident claim data, determining that a part may be reused, identifying whether the part matches an identified need based on historical data, determining whether to store or sell the part and/or managing the inventory flow of parts being stored for reuse, and performing other related functions as described herein. In some examples, one or more applications may be used to determine whether the vehicle is a total loss.

The systems described herein may be used by an insurance company, financial institution or other entity to maintain up to date part information and control the storage and sale of various parts. Although many examples herein will be described as being used in conjunction with an insurance company, the systems and methods described herein may be used by or with other entities or types of entities without departing from the invention.

Figure 2:
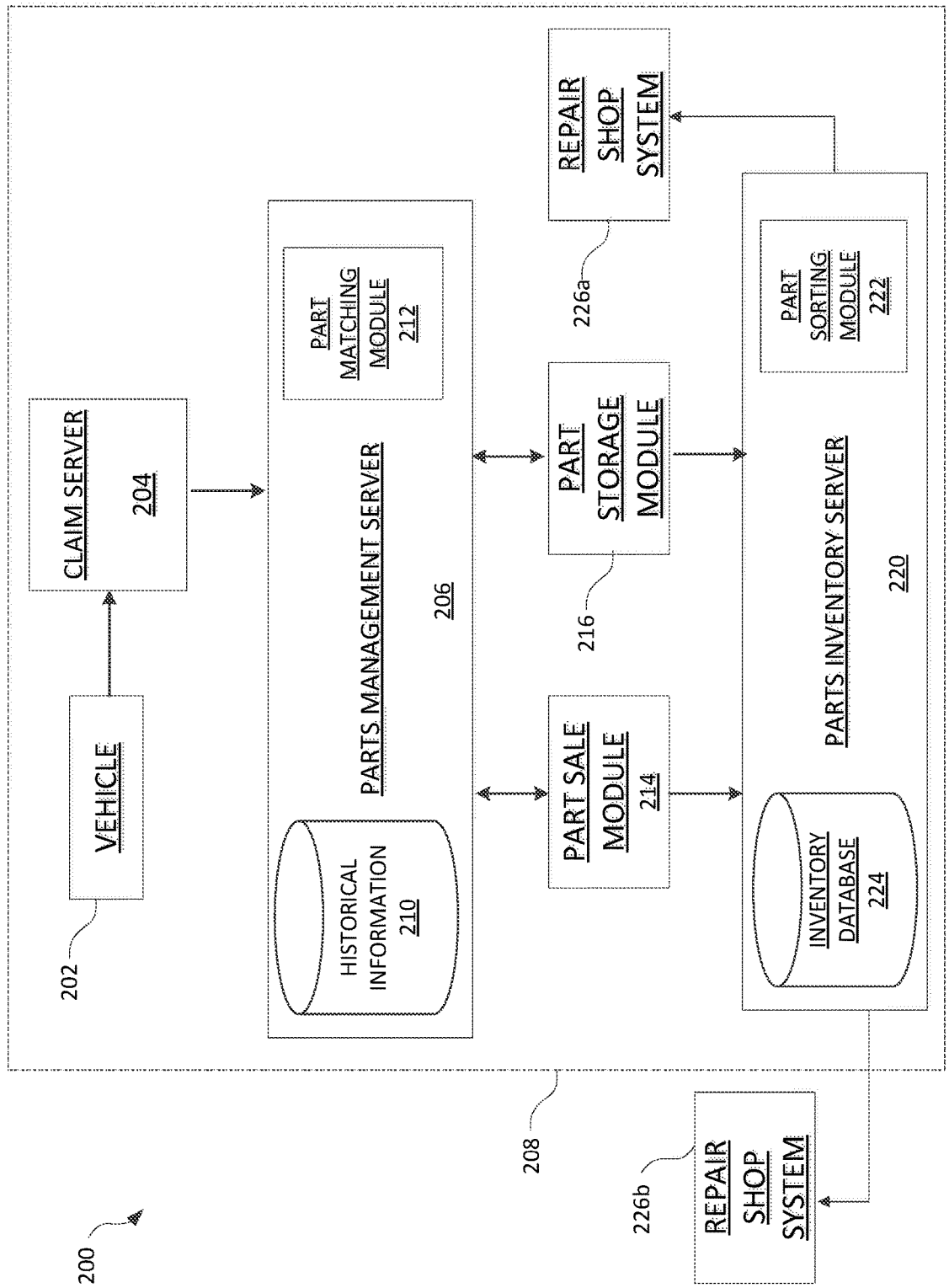
FIG. 2 is a diagram of an example parts management system, according to one or more aspects described herein.

FIG. 2 is a diagram of an illustrative parts management system 200. Each component shown in FIG. 2 may be implemented in hardware, software, or a combination of the two. Additionally, each component of the parts management system 200 may include a computing device (or system) having some or all of the structural components described above for computing device 101.

The parts management system 200 shown in FIG. 2 may include a claim server 204. The claim server 204 may be a computing device containing many or all of the hardware/software components of computing device 101 in FIG. 1. The claim server 204 may include hardware, software, and network components to receive and/or transmit claim information from a computing device or to a part management server, as will be discussed more fully below. The claim server 204 may be associated with an entity 208, such as an insurance company, and may receive claim information about an accident or damage to one or more vehicles associated with the entity, such as vehicle 202. In some examples, the vehicle may be associated with the entity prior to the accident or damage occurring. The vehicle may be an automobile, motorcycle, boat or other vehicle. The claim server 204 may receive information such as the type of vehicle involved in the accident (e.g., make, model, model year, etc.), type of accident (e.g., front end, rear end, etc.), particular areas of damage (e.g., driver side door, side view mirror, etc.), and the like. This information may be used, as in conventional systems, to process the insurance claim of the owner, and may further be used to identify parts that may be removed from the vehicle for reuse.

In some instances, the insurance company may determine that the vehicle is a total loss. Generally speaking, a vehicle may be a total loss if the costs to repair the damage to the vehicle outweigh the value of the vehicle. In some examples, the value of various parts on the vehicle may be a factor in determining whether the vehicle is a total loss.

Accordingly, parts management system 200 may further include parts management server 206. Parts management server 206 may be a computing device containing many or all of the hardware/software components of computing device 101 in FIG. 1. In some examples, claim server 204 and parts management server 206 may be an integrated part of a single server or system. Alternatively, claim server 204 and parts management server 206 may be servers/systems in communication with each other, such as via a network. Thus, both claim server 204 and parts management server 206 may include hardware, software and/or network components to transmit or receive (using known methods of transmission) information, such as claim information. In some examples, both the claim server 204 and the parts management server 206 may be part of or associated with the entity 208 using the system, e.g., an insurance company.

In some arrangements, parts management server 206 may include a historical information database 210 that is configured to store data associated with various vehicles, parts, accidents, etc. The historical information database 210 may be organized in any of several different manners. For example, a table in the historical information database may include a listing of all vehicles associated with the entity 208

(including make, model, year, etc.), as well as information associated with any accidents or claims recorded for the vehicles. The database 210 may also store data associated with vehicles no longer associated with the entity 208 but that were once associated with the entity 208. For instance, vehicles that were, at one time, insured by the insurance company but have since been insured by a different company or were, in some instances, in an accident that rendered the vehicle a total loss. Various other types of data may be stored in the historical information database 210. In some examples, the historical information database 210 may be connected to other systems, such as systems not associated with the entity 208 and may access information about vehicles not associated with the entity 208 that may be stored on those systems.

Parts management server 206 may further include a parts matching module 212. Parts matching module 212 may be implemented in hardware and/or software configured to perform a set of specific functions within the parts management server 206. For example, the parts matching module 212 may include one or more part matching algorithms which may be executed by one or more software applications running on generic or specialized hardware within the part management server 206. The parts matching module 212 may use claim information received from the claim server 204 and historical information from the historical information database 210 to perform one or more part matching functions. The part matching functions may include identifying one or more parts that may be removed from the damaged vehicle and reused based on the claim information received from the claim server 204 and determining whether the available parts meet an identified need based on the historical information. The identified need may be a current need or a projected or future need, as determined based on the historical information.

Parts management system 200 may further include part sale module 214 and part storage module 216. The modules 214, 216 may be implemented in hardware and/or software configured to perform a set of specific functions within the parts management system 200. For example, the part sale module 214 may include one or more algorithms for managing the sale of parts identified for sale (such as by the part matching module 212) that may be executed by one or more software applications running on generic or specialized hardware within the part management system 200. The part sale module 214 may use part matching information received from the parts management server 206 to transmit information about a part for sale, determine various purchasing entities available (e.g. repair shops) and determine sale information.

The part storage module 216 may, for example, include one or more algorithms for managing the storage of parts identified for storage (such as by the parts matching module 212) that may be executed by one or more software applications running on generic or specialized hardware within the parts management system 200. The part storage module 216 may use part matching information received from the parts management server 206 to identify and transmit information about parts being stored and determine storage location information.

Further descriptions and examples of the algorithms, functions, and analyses that may be executed using the parts matching module 212, parts sale module 214, parts storage module 216, the parts management server 206, parts inventory server 220, and parts sorting module 222 are described below in reference to FIGS. 3-5.

Figure 3:
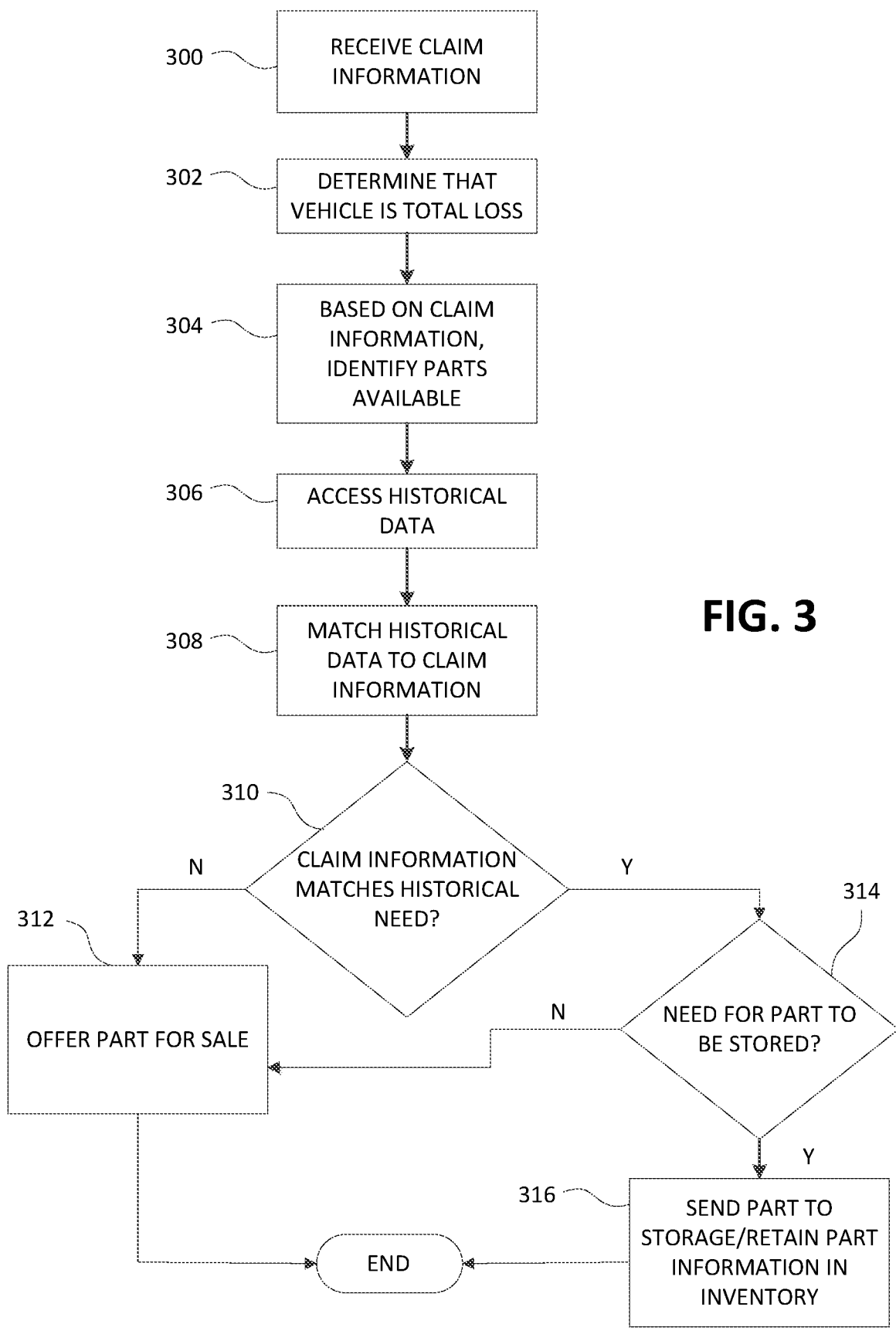
FIG. 3 is a flow diagram illustrating an example method of determining whether a part meets the criteria for storage by the entity or whether the part should be sold according to one or more aspects described herein.

FIG. 3 illustrates one example method of identifying parts that may be available for reuse and processing those parts. In step 300, claim information may be received. In some examples, the claim information may be received by an entity, such as an insurance company. The claim information may be related to a vehicle accident or other damage to a vehicle and may be processed according to one or more procedures of the entity. In step 302, it is determined that the vehicle is a total loss. Generally speaking, a vehicle may be a total loss if the costs to repair the damage to the vehicle outweigh the value of the vehicle. In some examples, the value of various parts on the vehicle may be a factor in determining whether the vehicle is a total loss.

In a conventional system, an insurance company may determine that a vehicle is a total loss and may take possession of the vehicle. The owner of the vehicle would then receive compensation in the amount of the value of the vehicle. The insurance company would then, in some examples, use a $3^{rd}$ party auction service to sell the car to a salvage yard who would remove various parts that may be usable. This arrangement may be inefficient because a third party would be maintaining and selling the usable parts. If the insurance company then needs a part from a total loss vehicle to repair another vehicle, the insurance company (or associated repair shop) must purchase the part.

Upon determining that the vehicle is a total loss, the insurance company may, based on the claim information, identify one or more usable parts available on the total loss vehicle, as in step 304. For instance, if the total loss vehicle was in a rear-end collision (e.g., the vehicle was hit from behind) it is likely that front end parts, such as a headlamp, might still be usable and, if removed, may be used to repair another vehicle. In some instances, it may be desirable to maintain the usable parts (e.g., store the parts by the insurance company) in order to use them in the repair of other vehicles associated with the insurance company, as will be discuss more fully herein.

In step 306, historical data may be accessed. In some examples, the historical data may be data associated with the insurance company or entity using the system. The historical data may include data associated with types of vehicles, number of vehicles associated with insurance company of a particular type, likelihood of repair being needed on a particular type, model, etc. of the vehicle, types of repairs typically needed, and the like. The historical data may be compiled over an extended period of time (e.g., several years) and may be used to predict whether a part should be stored by the insurance company for later use or sold.

For instance, in step 308, the claim information received by the system (e.g., parts management system) may be matched to the historical data to determine the likelihood that the part will be used for a subsequent repair. For instance, the historical data may be used to identify one or more needs and may be based on one or more historical data parameters, such as part number, vehicle make or model with which the part may be used, total number of cars using the part, likelihood that a particular part will be damaged, and the like. In step 310 a determination is made as to whether the received claim information and part information matches an identified need based on the historical data. If it does not match a need, the part may be sold in step 312.

Sale of the part may be performed as part of the sale of the total loss vehicle or, in some arrangements, may be performed for the part alone (or a group of parts). For instance, once any parts that may be desired for later use by the insurance company or entity using the system are removed, the remainder of the total loss vehicle may be sold, such as to a salvage yard, for scrap, etc. The parts not meeting an identified need may be left as part of the total loss vehicle and may be sold with the total loss vehicle. Alternatively, the parts may be sold to one or more repair shops for use in the repair of other vehicles (e.g., vehicles that may or may not be associated with the insurance company). In some examples, the entity implementing the system (e.g., the insurance company) may sell the parts directly. Additionally or alternatively, the entity may work with a distributor to whom they may sell the parts directly, or who may act as a sales agent for the entity. The parts may be sold individually to the distributor or may be sold as a part of a larger group of parts. The sale may be on-demand (e.g., once the parts are removed from the total loss vehicle they are sold) or may be sold on a regular or semi-regular basis, e.g., weekly, monthly, etc. Payment for the part may be received by the entity either from the distributor at the sale of the part to them, or from the sale from the distributor to an end user. The payment may be a flat fee or may be a percentage of the ultimate sale price of the part.

If, in step 310, a determination is made that the claim information received matches an identified need, a determination may be made in step 314 as to whether the part should be stored for future use. For instance, if, based on the accessed historical data, there is a likelihood that the part may be used for a repair, such as on a repair for a vehicle associated with the insurance company (e.g., insured by the insurance company), the part may be stored by the insurance company (or an associated entity) for use in such a likely repair, such as in step 316. Alternatively, if the part does match an identified need in step 310 but, in step 314, it is determined that there is not a sufficient likelihood that the part will be used in a repair, the part may be sold in step 312.

In some examples, determining a likelihood that the part may be used for a repair may be based on a variety of factors. For instance, the number of vehicles that may use the part being considered, the number of vehicles associated with the insurance company that may use the part being considered, historical data regarding the number of times the part being considered has been replaced or repaired in the past, the number of accidents of vehicles that may use the part being considered, the frequency of accidents of those types of vehicles, and the like. In some examples, determining whether to store or sell the part being considered may also be based on one or more time restrictions. For instance, in determining whether it is likely that the part being considered will be used in a future repair, a particular time limit may be set. For example, if, based on historical data, it is likely that the part will be needed in the next month, three months, etc., the part may be stored. However, if historical data indicates that, while it is likely that a part of this type may be used in a repair, it may not be for 6 months, one year, etc., the entity using the system may determine that that is too long a period to store the part and thus may decide to sell the part rather than storing it. Accordingly, various parameters may be set up by the insurance company to determine whether to store or sell the part.

Figure 4:
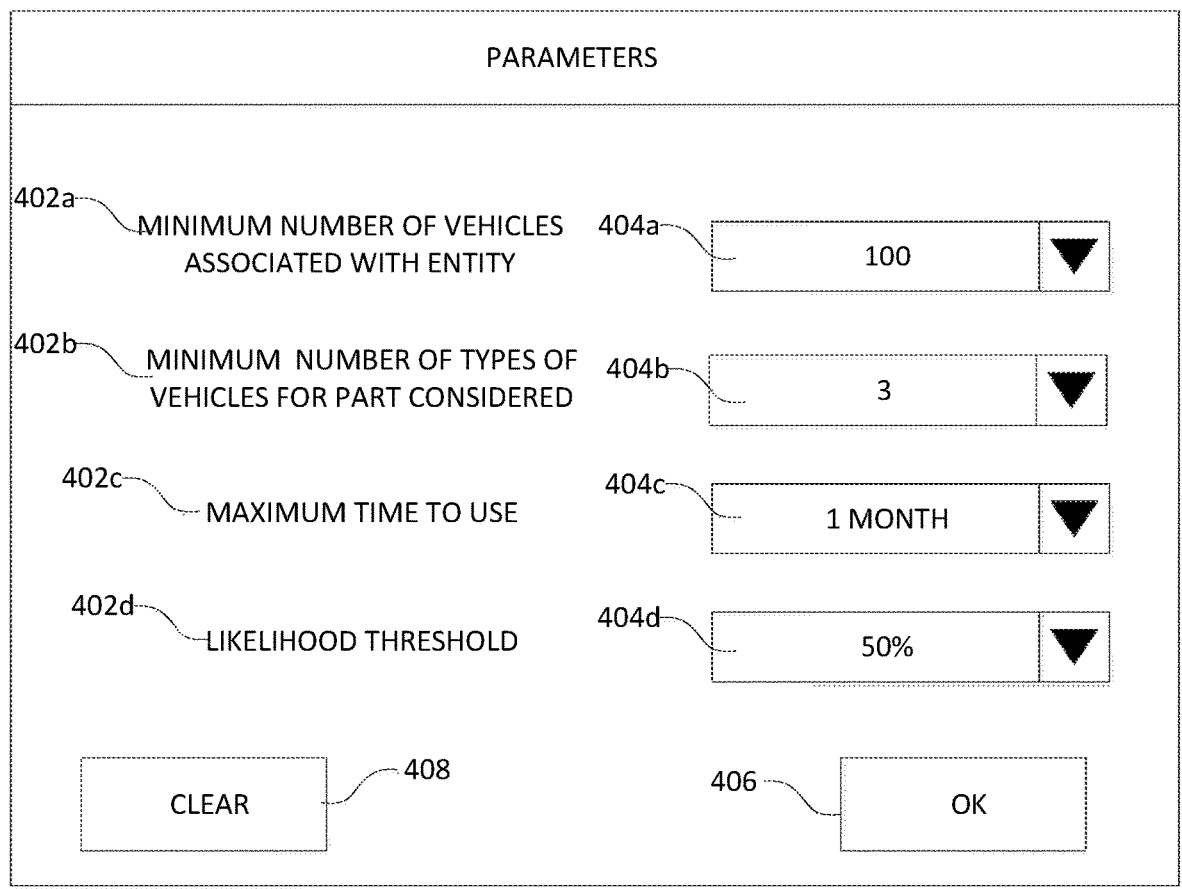
FIG. 4 illustrates an example user interface providing one or more parameters that may be used in the determination of whether to store or sell a part according to one or more aspects described herein.

For example, FIG. 4 illustrates one example user interface in which various parameters for determining whether to store or sell the part may be input. User interface 400 includes one or more parameters, 402a-402d. The parameters 402a-402d described are merely some examples of parameters that may be used to determine whether to store or sell a part being considered. Accordingly, various other parameters, or more or fewer parameters, may be used without departing from the invention.

Parameters 402a-402d may include parameter 402a, a minimum number of vehicles associated with the entity using the system, e.g., the insurance company, with which the part may be used. For example, the entity may desire that at least 100 cars associated with the entity be able to be used with the part in order for the part to be stored for future use. Parameter 402b may be a minimum number of types of vehicles on which the part may be used. For instance, common parts may be used on more than one type of vehicle. Accordingly, the entity may set a minimum number of types of vehicles on which the part can be used for it to be stored. Parameter 402c may include a maximum time in which the part will be used. For instance, the entity may not have the resources to store parts for an extended period of time and thus it would be advantageous to have the part be used in a repair within the maximum set period of time. Parameter 402d may include a minimum threshold for there to be deemed a likelihood that the part will be reused within the parameters set. If at or above the threshold, the system may identify the part as a part to be stored for reuse. If below the threshold, system may identify the part as a part to be sold. For instance, if, based on the historical data, there is at least a 50% likelihood that the part will be reused, then the part may be stored for reuse. If there is less than 50% likelihood, the part may be sold. Various other percentages or values may be used to determine likelihood without departing from the invention.

Fields 404a-404d provide fields in which a user may input a desired value for each of parameters 402a-402d. As shown in FIG. 4, the fields 404a-404d may include drop down menus having predefined values from which a user may select. Additionally or alternatively, the user may access the field (e.g., by clicking or double-clicking in the field) and may input the desired value for each parameters. Various other known methods of inputting values may be used without departing from the invention. Further, the values illustrated in fields 404a-404d are merely example values and are not meant to limit the available values of any of the fields.

Once the desired values have been input into fields 404a-404d, the values may be saved and used in determining whether to store or sell parts by selecting "OK" option 406. Alternatively, any entered values may be cleared by selecting "CLEAR" option 408.

Although FIG. 4 illustrates various parameters as being input by a user, in some arrangements, the parameters may be predetermined or automatically determined. Additionally or alternatively, the parameters may be determined by a user and may be changed by users having a specified level of access to the system.

If it is determined that a part will be stored for future use, in some examples, the part may be stored by the entity using the system (e.g., the insurance company) or it may be stored by a related entity. For example, an insurance company may be partnered with, affiliated with, own, etc. a repair shop or plurality of repair shops. In some arrangements, for instance, when the owner of the vehicle does not have a repair shop in mind, the insurance company may refer repair work on vehicles insured by or associated with the insurance company to be performed at one of these shops. Accordingly, the repair shop may store the part for future use. In such an arrangement, the part may be available for use by the repair shop when needed.

In some examples, the determination that the part will be stored may be made before the part is removed from the total loss vehicle. Accordingly, the insurance company or other entity may direct the part to a certain shop based on historical data. Additionally or alternatively, the insurance company or other entity may have a record of the part being in an inventory of parts associated with the insurance company before the part is even removed from the total loss vehicle. In such arrangements, it is advantageous to manage the inventory flow of these parts available for reuse.

With further reference to FIG. 2, the parts management system 200 may further include a parts inventory server 220. The parts inventory server 220 may be a computing device containing many or all of the hardware/software components of computing device 101 in FIG. 1. In some examples, parts inventory server 220 may be an integrated part of a single server including the claim server 204 and/or parts management server 206. Additionally or alternatively, parts inventory server 220, claim server 204 and parts management server 206 may be servers/systems in communication with each other, such as via a network. Thus, parts inventory server 220, claim server 204 and parts management server 206 may include hardware, software, and/or network components to transmit or receive (using known methods of transmission) information. In some examples, the parts inventory server 220 may be part of or associated with an entity 208 using or implementing the parts management system 200.

In some arrangements, parts inventory server may include a part sorting module 222. The parts sorting module 222 may be implemented in hardware and/or software configured to perform a set of specific functions within the parts inventory server 220. For example, the parts sorting module 222 may include one or more parts sorting algorithms that may be executed by one or more software applications running on generic or specialized hardware within the parts inventory server 220. The parts sorting module 222 may use information from the parts management server 206, claim server 204, parts sale module 214 and parts storage module 216 to perform one or more inventory functions. For instance, the parts sorting module 222 may receive information about parts being sold or stored and may determine when, based on received information, the part will be available for use, and, in some examples, may identify one or more repair shops to which this information should be communicated. The repair shops may be shops associated with the entity 208 or shops not associated with the entity 208. In some arrangements, the information on when the part will be available for use may be determine prior to the part being removed from the vehicle or prior to the part being physically available for use. Accordingly, the availability information may be a projected, future availability date of the part.

Parts inventory server 220 may also include inventory database 224 that is configured to store information regarding the parts available for use. For instance, the inventory database 224 may include information including part numbers, condition of the part, manufacturer information, status of part (e.g., whether it has been removed from the vehicle), availability or projected availability of the part, number of parts available, and the like.

In some arrangements, the parts sorting module 222 may use information from the inventory database 224 to determine a projected availability of a part and to determine which repair shop(s) to which the part inventory information should be communicated. In some examples, this information may then be stored in the inventory database 224. In some arrangements, the information stored in the inventory database may be accessible by one or more repair shops. Accordingly, as inventory information is updated (e.g., with new parts available or projected to be available, etc.) the repair shops may be able to view or access this information.

The parts management system 200 may further include or be in communication with one or more repair shop systems 226a, 226b. The repair shop systems 226a, 226b may be systems of repair shops associated with or part of the entity 208, as in system 226a, or may be systems of repair shops not associated with the entity 208, such as system 226b. Repair shops not associated with the entity may include repair shops that may be searching inventory in order to purchase a part. Additionally or alternatively, the repair shops not associated with the entity 208 may desire to obtain the part for use in the repair of a vehicle that may or may not be associated with the entity (e.g., a vehicle that is insured by the insurance company entity or a vehicle insured by another insurance company).

The systems 226a, 226b may include many or all of the components discussed above with respect to computing device 101 in FIG. 1. The repair shop systems 226a, 226b may be able to access inventory information of the entity 208, such as via parts inventory server 220. Additionally or alternatively, the part availability information may be communicated to the repair shop systems 226a, 226b via known methods of communication such as email, SMS, MMS, and the like. The communications may be received by computing devices at the repair shop systems 226a, 226b including computer terminals, portable computing devices such as laptops, tablet computers, etc. and/or via a mobile device or smartphone.

Figure 5:
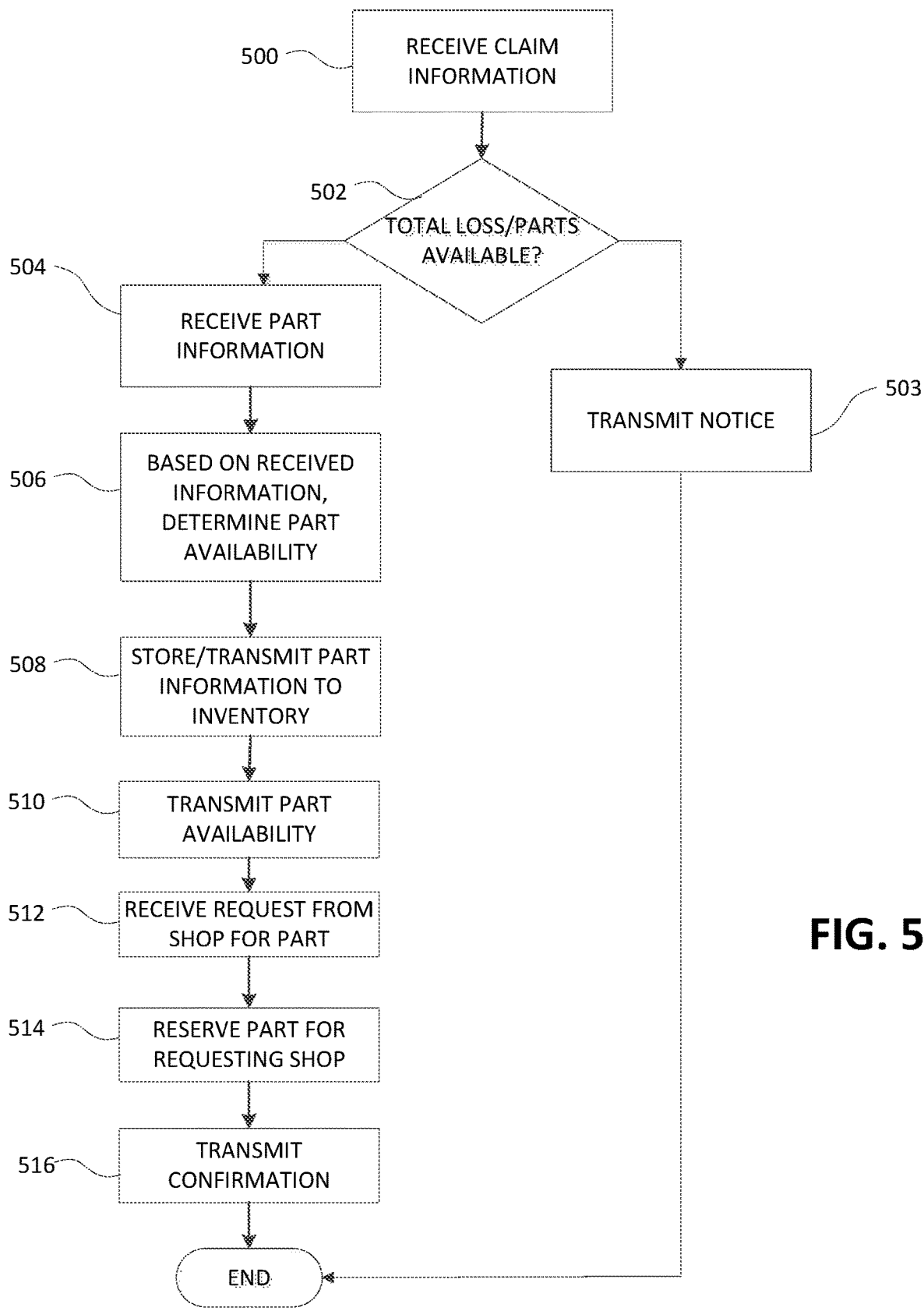
FIG. 5 is a flow diagram illustrating an example method of managing inventory flow according to one or more aspects described herein.

FIG. 5 illustrates one example method of managing parts inventory. In step 500, claim information is received. In some examples, the information may be received by the parts inventory server 220. Claim information may include information as discussed above, such as type of vehicle, location of damage, and the like. In step 502, a determination is made, based at least in part on the received claim information, of whether the vehicle is a total loss and/or whether there are parts available for reuse. For instance, the extent of the damage determined based on the received claim information may indicate whether the vehicle is repairable or that the vehicle is a total loss and, in some instances, that no parts are available for reuse. In some examples, this information may be transmitted, such as to the parts management system of the entity, in step 503. Accordingly, the method may end at that point. Alternatively, the vehicle may be a total loss and one or more parts may be available for reuse. If so, the method will continue to step 504.

In step 504, part information may be received, such as by the parts inventory server 220. Part information may be received from a variety of sources. For instance, part information may be received from claim server 204, parts management server 206, etc. In some arrangements, part information may include part number, manufacturer information or other identifying information. Part information may further include the status of the part. That is, the part information may identify whether the part has been removed from the vehicle, if so, where the part is currently stored, and, if not, when the part is expected to be removed from the vehicle. Part information may further include whether the part is being stored for later use by the entity or a related entity, or whether the part will be sold. Such information may be determined by and/or received from the parts matching module 212, parts sale module 214 and/or parts storage module 216.

In step 506, an availability date for the part may be determined. The date of availability of the part may be determined based on the received information, such as whether the part has been removed from the vehicle, where the part is currently stored, when the part is expected to be removed, whether the part is being sold or stored for later use, and the like. The availability date, as well as other part information for the part may be stored, for example, in the part inventory database 224, as indicated in step 508. In some examples, whether the part is identified as a part to be sold or stored will affect how the part information is stored in the inventory database. For instance, if a part is being sold, the availability of the part may be visible for all shops, whether they are affiliated with the entity or not. Thus, any repair shop needing the part may be able to access the part. Additionally or alternatively, the parts being sold may be visible to one or more distributors who may then attempt to sell the part. In one example, an entity may form an affiliation with one or more distributors to facilitate sale of the parts identified for sale. In such an arrangement, the affiliated distributors may be able to view the part in inventory and/or access the part, while other distributors, repair shops, etc. may not be able to access that particular part.

In step 510, the availability of the part in inventory may be transmitted or communicated, for instance, to one or more repair shops. The communication may be an active communication, such as an email, SMS, MMS, and that like and may indicate the new part information or may provide an indication that new inventory has been added to the inventory (e.g., inventory database). Additionally or alternatively, the communication may be passive, such that the part will be added to inventory and will be visible when a search for that particular part is conducted but might not be transmitted to the repair shops.

In step 512, a request for the part may be received by the parts inventory server. The request for the part may be in response to an active communication from the entity or may be upon review of the inventory of the entity. The request for the part may be transmitted to the entity and received, such as by system 200. The request may come from a vehicle repair shop that is affiliated or associated with the entity (e.g., a repair shop owned by the insurance company entity or owned by the same company as the insurance company) or may come from a repair shop not associated with the entity. In some examples, the part may be requested by the vehicle repair shop for use in the repair of another vehicle associated with the entity (e.g., another vehicle insured by the entity). In other examples, the part may be requested for repair of a vehicle not associated with the entity.

In step 514, the part may be reserved for the requesting vehicle repair shop. In some examples, reserving the part may include a deposit or other payment made to the entity. Reserving the part may include identifying the part as claimed by the requesting repair shop and indicating, such as in the parts management system, that the part should be transferred to the requesting repair shop when the part becomes available. In step 516, a confirmation that the part has been reserved may be transmitted to the requesting vehicle repair shop. In some arrangements, the confirmation may include a date on which the part will be transferred to the requesting repair shop. For instance, the confirmation may include the projected availability date determined for the part (as in step 504) as the date the part will be transferred to the requesting repair shop.

Although the steps of the method described in FIG. 5 are presented in the above-described order, the order of the steps may vary without departing from the invention. For instance, transmission of part availability in step 510 may come before storing the part information in inventory in step 508. Further, some or all of the steps described in FIG. 5 may be performed prior to the part being physically available for use. For instance, some or all of the steps described in FIG. 5 may be performed prior to the part being removed from the damaged/total loss vehicle. Thus, the inventory of parts may be managed well in advance of the part being put into use so that repair shops may not have to wait as long for parts or may be able to better estimate time to repair vehicles.

Although various aspects of the disclosure have been described with reference to a vehicle having been deemed a total loss, aspects of the arrangements described herein may be used in instances where a vehicle is not a total loss. For instance, a vehicle may be struck on the driver's side and the driver's side door may be damaged. Although the vehicle may not be a total loss, the driver's side door may be replaced rather than repaired. If the door is being replaced, one or more parts from that door (e.g. mirror, glass, door handle) may be available for reuse according to one or more aspects described herein.

In order to better understand the above-described inventions, below is an example arrangement in which the arrangements described herein may be used. This is merely one example arrangement and should not be viewed as limiting the inventions to the recited example.

Vehicle A is struck by Vehicle B. No one is injured in the accident but Vehicle A is heavily damaged. A claim is made to Insurance Company A, the insurer of Vehicle A. The claim information includes a description of the damage, parts that have been damaged and the extent of the damage. In this example, Vehicle A was struck in the front end. Based on the claim information, it is determined that the vehicle is a total loss. That is, the cost to repair Vehicle A is more than the value of Vehicle A. Accordingly, one or more parts are identified as being available for reuse from Vehicle A. For instance, because Vehicle A was struck in the front, the taillights of Vehicle A are available for reuse. The determination that the part may be reused may be performed prior to the part being removed from Vehicle A.

One or more systems at Insurance Company A determines whether the taillights from Vehicle A match an identified need of Insurance Company A. For instance, Insurance Company A may analyze the part information and determine that that particular part is likely to be used in the repair of another vehicle insured by Insurance Company A. This may be based on the number of similar vehicles insured by Insurance Company A and/or historical data indicating a number of incidents involving replacement of this particular part. Accordingly, Insurance Company A determines that it will be efficient to store the part until it is needed for a repair rather than sell this particular part.

Insurance Company A then places information about the part in inventory. In some examples, Insurance Company A may send a message, such as an email, to one or more repair shops indicating that the part has been added to inventory. In some arrangements, the vehicle repair shops receiving the notice may be owned by the insurance company or otherwise affiliated with the insurance company. The communication may also include a future availability date since, at this point, the part may still have not been removed from the vehicle.

Vehicle Repair Shop A may receive the notice from Insurance Company A and may have a need for the part to repair Vehicle C. In response to the communication from Insurance Company A, Vehicle Repair Shop A may request the part that has been added to inventory. In response to the request, Insurance Company A may reserve the part for Vehicle Repair Shop A and may send a confirmation to Vehicle Repair Shop A indicating the date that the part will become available (e.g., will have been removed from Vehicle A and will be ready for shipment to Vehicle Repair Shop A). Vehicle Repair Shop A can then better estimate the time it will take to repair Vehicle C, the cost associated with the repairs, and can better manage the workflow of the repair shop.

The above described example, is merely one example of how one or more aspects of the arrangements described herein may be implemented. Various other arrangements may be implemented in a variety of ways without departing from the invention.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:

1. A parts management system for controlling inventory flow of vehicle parts comprising:
    a processing unit comprising a processor; and
    a memory unit storing computer-executable instructions, which when executed by the processing unit, cause the parts management system to:
        query a database to obtain information identifying at least one part of a plurality of vehicle parts to be removed from a first vehicle for reuse;
        execute an application for performing one or more inventory functions to determine a future availability date for the at least one part to be removed from the first vehicle for reuse;
        transmit information about the at least one part to be removed from the first vehicle for reuse to a computing system of at least one vehicle repair shop, wherein the information transmitted includes the future availability date of the at least one part to be removed from the first vehicle for reuse,
        receive, from the computing system of the at least one vehicle repair shop, a request to obtain the at least one part to be removed from the first vehicle for use in repair of a second vehicle; and
        transmit, to the computing system of the at least one vehicle repair shop, a confirmation that the at least one part will be transferred to the at least one vehicle repair shop on the future availability date.

2. The parts management system of claim 1, wherein the application for performing the one or more inventory functions is executed by a parts sorting device of the parts management system.

3. The parts management system of claim 1, further including instructions that, when executed, cause the parts management system to transmit the information about the at least one part to a parts inventory server of an entity.

4. The parts management system of claim 3, wherein the transmitted information is accessible by the computing system of the at least one vehicle repair shop via the parts inventory server of the entity.

5. The parts management system of claim 1, wherein the information identifying at least one part of a plurality of vehicle parts to be removed from a first vehicle for reuse is based on insurance claim information identifying damage to particular portions of the first vehicle.

6. The parts management system of claim 1, further including instructions that, when executed, cause the parts management system to receive an indication that the at least one part matches an identified need of an entity.

7. The parts management system of claim 1, further including instructions that, when executed, cause the parts management system to receive identification of the first vehicle as a total loss.

8. A parts management system for controlling inventory flow of vehicle parts, comprising:
    a processing unit comprising a processor; and
    a memory unit storing computer-executable instructions, which when executed by the processing unit, cause the parts management system to:
        query a database to obtain information corresponding to damage to a first vehicle and information identifying the first vehicle as a total loss;
        receive information identifying at least one part of a plurality of vehicle parts of the first vehicle to be removed from the first vehicle for reuse;
        execute an application for performing one or more inventory functions to determine a future availability date for the at least one part;
        transmit information about the at least one part to be removed to computing systems of a plurality of vehicle repair shops, wherein the transmitted information includes the determined future availability date;
        receive, from a computing system of a first vehicle repair shop, a request to obtain the at least one part for use in a repair of a second vehicle; and
        transmit, to the computing system of the requesting first vehicle repair shop, a confirmation that the at least one part will be transferred to the requesting first vehicle repair shop on the future availability date.

9. The parts management system of claim 8, further including instructions that, when executed, cause the parts management system to receive an indication that the at least one part matches an identified need.

10. The parts management system of claim 9, wherein the identified need is based on historical data.

11. The parts management system of claim 8, further including instructions that, when executed, cause the parts management system to transmit the information about the at least one part to be removed to a parts inventory server.

12. The parts management system of claim 11, wherein the parts inventory server is accessible by the plurality of vehicle repair shops.

13. The parts management system of claim 8, wherein the second vehicle is associated with an entity associated with the first vehicle.

14. The parts management system of claim 8, further including removing the at least one part from the first vehicle.

15. The parts management system of claim 14, further including using the removed at least one part from the first vehicle in the repair of the second vehicle.

16. A method for controlling inventory flow of vehicle parts, comprising:
    querying, by a parts management system having at least one processor, a database to obtain information identifying at least one part of a plurality of vehicle parts to be removed from a first vehicle for reuse;
    executing, by the parts management system, an application for performing one or more inventory functions to determine a future availability date for the at least one part to be removed from the first vehicle for reuse;
    transmitting, by the parts management system, information about the at least one part to be removed from the first vehicle for reuse to a computing system of at least one vehicle repair shop, wherein the information transmitted includes the future availability date of the at least one part to be removed from the first vehicle for reuse, receiving, from the computing system of the at least one vehicle repair shop and by the parts management system, a request to obtain the at least one part to be removed from the first vehicle for use in repair of a second vehicle; and transmitting, by the parts management system and to the computing system of the at least one vehicle repair shop, a confirmation that the at least one part will be transferred to the at least one vehicle repair shop on the future availability date.

17. The method of claim 16, wherein the application for performing the one or more inventory functions is executed by a parts sorting device of the parts management system.

18. The method of claim 16, further including transmitting, by the parts management system, the information about the at least one part to a parts inventory server.

19. The method of claim 18, wherein the transmitted information is accessible by the computing system of the at least one vehicle repair shop via the parts inventory server.

20. The method of claim 16, further including receiving, by the parts management system, an indication that the at least one part matches an identified need of an entity.

* * * * *